UNITED STATES PATENT OFFICE.

EMILE BRONNERT, OF MULHOUSE, GERMANY, ASSIGNOR TO THEODORE SCHLUMBERGER.

MANUFACTURE OF SOLUTIONS OF TETRANITROCELLULOSE.

SPECIFICATION forming part of Letters Patent No. 573,132, dated December 15, 1896.

Application filed April 14, 1896. Serial No. 587,516. (No specimens.)

*To all whom it may concern:*

Be it known that I, EMILE BRONNERT, of Mulhouse, Germany, have invented certain new and useful Improvements in the Manufacture of Solutions of Tetranitrocellulose, (collodion pyroxylin,) as fully described in the following specification.

As solvents for tetranitrocellulose (collodion pyroxylin) the following substances are or may be employed: acetic ether, mixtures of ether and alcohol, methylated spirits, acetone, nitroglycerin, nitrobenzene, acetic acid, acetate of amyl, alcoholic and etheral solutions of camphor, binitrobenzene, nitronaphthalene, anilides like benzanilide. Acetoluide and analogous substances, binitrobenzene, nitronaphthalene, and anilides like benzanilide have also been used for preparing the so-called "solid solutions" in the manufacture of explosive matters. Nevertheless, the price of most of the solvents, the explosibility of the vapors of the more volatile ones, the toxicity of the vapors of some of them, and other serious inconveniences rendered the discovery of cheaper and more innocuous solvents very desirable for many technical purposes.

In the course of my investigations I have found that alcohol, such as ethylic, which does not dissolve tetranitrocellulose at all, can be changed into a very good solvent when to it is added in even small quantities (five per cent. or more) alkaline chlorid or chlorid of the alkali-earth metals, earths and zinc. The substance preferably employed is chlorid of calcium, ($CaCl_2$.) A solution of collodion pyroxylin thus made will yield, upon evaporation, a cohesive film capable of use in the arts generally.

I do not confine myself to any particular proportions, nor to any special method of mixing the ingredients, nor to any particular mode of introducing the chlorid of calcium, nor to any particular state of the latter; but I find that the mode of procedure hereinafter given as a detailed illustration is very practical and economical.

Example: Thirty kilograms tetranitrocellulose when moist, as when taken out of the hydroextractor, is carefully impregnated with a concentrated solution of chlorid of calcium in water, squeezed and dried at 45° centigrade. Forty kilograms of the dried impregnated tetranitrocellulose are then dissolved in one hundred and fifty liters of strong ethylic alcohol.

Solutions of tetranitrocellulose generally are made up with a mixture of ether and alcohol.

The principal advantages of my invention are the following:

First. I use only the cheap alcohol, thereby avoiding the dangerous and expensive ethers.

Second. The impregnation of the wetted tetranitrocellulose with a solution of chlorid of calcium renders the tetranitrocellulose but slightly inflammable and neutralizes the small quantities of sulfuric acid which generally are still contained even in a well-washed pyroxylin, because of the capillary attraction in the cotton or wood fiber taken as a raw material.

Third. The drying operation can therefore be carried out without any danger, no self-decomposition being possible.

Fourth. The dried impregnated tetranitrocellulose is not subject to spontaneous decomposition.

Fifth. The risks of accidents from concussion are minimized.

Sixth. Products like celluloid, artificial silk, and varnishes made up with my new solutions are not inflammable. They become readily wetted on the surface when they are kept in a moist atmosphere.

Seventh. The chlorid of calcium can be easily removed by washing the manufactured product with water.

Eighth. The alcohol can easily be condensed and employed again.

In the manufacture of solutions of collodion pyroxylin I may, as already stated, substitute for the chlorid of calcium any of the chlorids of alkali and alkali-earth metals, earths and zinc which are soluble in strong alcohol.

Ethylic alcohol has been specified as an alcohol in which, as is well known, collodion pyroxylin is not soluble at all. Other alcohols, such as methylic, in which collodion pyroxylin is slightly soluble, are rendered excellent solvents by my process.

For certain purposes the chlorid of calcium may be substituted by the acetates or alkysulfates of the above-named metals by oxalic, citric, or carbolic acid, and it is to be understood that these substances are equivalents for the purposes specified of chlorid of calcium.

Having thus described my invention, what I claim as new, and desire to secure by Letters Patent, is—

1. In the process of manufacturing collodion pyroxylin, the improvement consisting in adding thereto a substance (such as calcium chlorid) which renders it soluble in alcohol, which is itself not a solvent of collodion pyroxylin and then dissolving in alcohol, substantially as described.

2. As a new article of manufacture, the product of the described process, being collodion pyroxylin dissolved in alcohol with the addition of a substance such as calcium chlorid, and being slightly inflammable, not liable to spontaneous decomposition or to explosion from concussion, substantially as described.

In witness whereof I have hereunto signed my name in the presence of two subscribing witnesses.

EMILE BRONNERT.

Witnesses:
JULIUS MANDEL,
GEORGE GIFFORD.